United States Patent [19]

Swindler

[11] 4,077,656
[45] Mar. 7, 1978

[54] SEALED JOINT AND GASKET THEREFOR

[75] Inventor: Henry A. Swindler, Palo Alto, Calif.

[73] Assignee: Parker-Hannifin Corporation, Cleveland, Ohio

[21] Appl. No.: 725,075

[22] Filed: Sep. 21, 1976

[51] Int. Cl.² ............................................ F16L 17/06
[52] U.S. Cl. .............................. 285/110; 277/207 R; 285/312; 285/379
[58] Field of Search ............... 285/312, 110, 379, 320; 277/207 R, 212 F, DIG. 2

[56] References Cited

U.S. PATENT DOCUMENTS

| | | | |
|---|---|---|---|
| 1,083,350 | 1/1914 | Davis | 285/379 |
| 1,580,462 | 4/1926 | Woodruff | 277/212 F |
| 2,487,669 | 11/1949 | Pattullo et al. | 277/207 X |
| 3,123,367 | 3/1964 | Brummer et al. | 277/207 R |
| 3,334,774 | 8/1967 | Poltorak | 220/46 |
| 3,642,294 | 2/1972 | Hammon | 277/207 R |

FOREIGN PATENT DOCUMENTS

| | | | |
|---|---|---|---|
| 585,230 | 11/1958 | Italy | 285/110 |
| 807,205 | 1/1959 | United Kingdom | 277/DIG. 2 |
| 855,557 | 12/1960 | United Kingdom | 285/312 |

Primary Examiner—Thomas F. Gallaghan
Attorney, Agent, or Firm—John N. Wolfram

[57] ABSTRACT

A joint between two members and a gasket therefor. The members have transverse annular opposed faces. The gasket is a ring having a base and a frusto-conical lip extending radially inward from the base. The base is adapted to be clamped between the two faces of the members and has serrations on one side thereof for establishing sealing contact with one of the faces. The frusto-conical lip extends axially toward the other face and is subject to fluid pressure for ensuring sealing contact therewith.

5 Claims, 4 Drawing Figures

U.S. Patent    March 7, 1978    4,077,656

SEALED JOINT AND GASKET THEREFOR

BACKGROUND OF THE INVENTION

Hoses used for filling and emptying gasoline tank trucks have end fittings thereon that permit the hose to be connected in a fluid tight manner to a valved fitting on the tank truck. In some arrangements the two fittings are sealed relative to each other by an elastomeric flat gasket that engages opposed faces on the fittings and simply squeezed thereby for sealing the joint when the fittings are attached to each other by cam action of a quick connect and disconnect mechanism. Such joints are not altogether satisfactory because with tolerance variations the travel of the fittings toward each other by cam action may vary so much that in some assemblies there will be insufficient pressure exerted on the gasket to establish a seal and in other assemblies the compression will be so great that it is difficult to operate the cams to their full lock position. In the latter case there will also be excessive wear on the surfaces contacted by the cams.

SUMMARY OF THE INVENTION

The present invention provides a joint between two members to be connected, and a gasket for such joint, and wherein the joint can accommodate substantial variance in the parts without resulting either in leakage or in difficult attachment of the members to each other. This is accomplished by providing the members with opposed annular transverse faces and providing an elastomeric gasket having a base with serrations on one side thereof and with a frusto-conical lip extending from the base. The base is adapted to be clamped between the two faces of the members to be sealed with the serrations in sealing contact with one of the members and with the frusto-conical lip engaging the other member in a manner so that the lip will be sealed thereagainst by fluid pressure. Both the serrations and the lip permit substantial travel of the two members toward each other after initial sealing contact of the members with the serrations and lip without causing a great increase in the amount of force required to move the members toward each other for deforming the gasket. Thus the joint will be tight and easy to accomplish regardless of whether the manufacturing variations in the dimensions of the parts are such that the cam mechanism will apply either a small or a large amount of travel of the members toward each other from the position of initial sealing contact with the gasket to the final assembled position.

DETAIL DESCRIPTION

Figure 1:
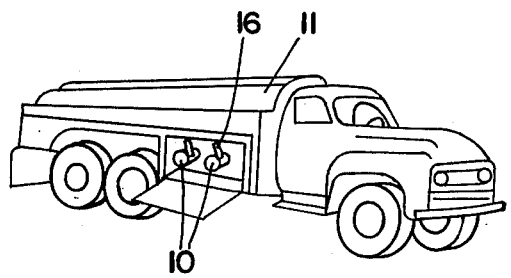
FIG. 1 illustrates a gasoline tank truck with tank fittings for which the invention is particularly useful.
Figure 2:
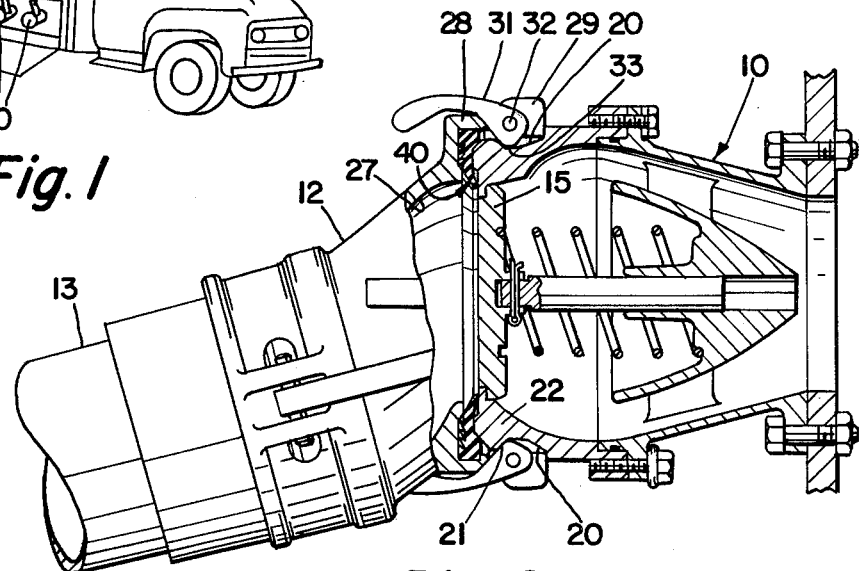
FIG. 2 is a view, partly in section, illustrating the gasket and seal joint as applied to tank truck fittings.

The invention has particular usefulness in connection with a valved fitting 10 on a tank truck 11 to which a hose fitting 12 may be connected for either loading gasoline into the tank truck or unloading it therefrom through a hose 13.

The fitting 10 may have a valve element 15 therein openable by fluid pressure in fitting 12 during a loading operation or which may be manually opened by handle 16 and a mechanism not shown for the unloading operation.

Valved fitting 10 has an annular groove 20 near one end and an inclined surface 21 which forms one side of a raised rib 22. There is another inclined surface 23 on the other side of rib 22 which terminates in an annular flat clamping face 24 that is offset slightly from an annular transverse sealing face 25.

Fitting 12 has a fluid passage 27 therein and at one end has a cylindrical extension 28 for telescopically receiving groove 20 and rib 21 of the valved fitting 10. Extension 28 has several circumferentially spaced slots 29 in which levers 31 are pivotally mounted on pins 32. The levers have cam surfaces 33 for engaging rib surface 21 to move fitting 12 toward valved fitting 10 from an initial hand placed position to a final clamped position.

Cylindrical extension 28 has a recess 34 with a first retainer rib 35 axially spaced from a bottom wall sealing surface 36. There is also a second retaining rib 37 offset from surface 36.

Mounted within recess 34 is an elastomeric gasket 40 which has a base 41 and a frusto-conical lip 42. Base 41 has a series of annular serrations 43 on one side thereof for sealingly engaging fitting surface 36 and it has a clamping surface 44 on the other side thereof that is inwardly slightly offset from a retaining surface 45 that is engaged by rib 35 for retaining the gasket within recess 34. Base 41 also has a surface 46 that is slightly offset from the outer tips of serrations 43.

Lip 42 has an external frusto-conical surface 47 which preferably has an included angle of about 150° and also has an internal frusto-conical surface 48 which preferably has an included angle of about 135° so that lip 42 will be thinner in cross section at its radially inner end than at its radially outer end where it joins base 41.

Figure 3:
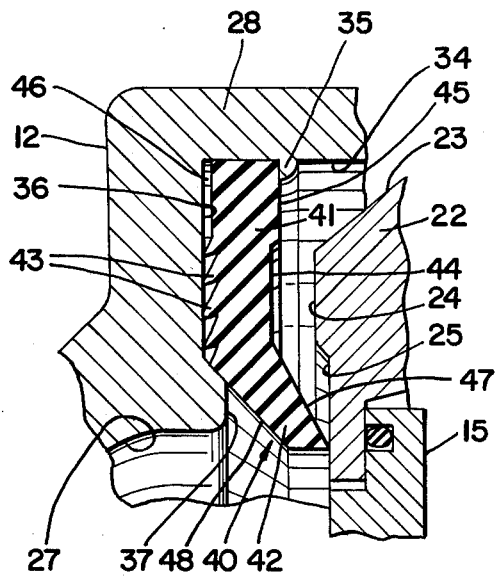
FIG. 3 is an enlarged fragmentary cross section view showing the fitting parts in initial sealing contact with the gasket but before deformation of the gasket thereby.

Gasket 40 is so dimensioned and located that when valved fitting rib 22 is within recess 34 for initial engagement by cams 33, clamping surface 24 will be axially opposite surface 44 and serrations 43 of the gasket but will be spaced from surface 44. At the same time, gasket lip 42 will be axially opposite valved fitting sealing surface 25 and in light contact therewith, all as shown in FIG. 3.

Figure 4:
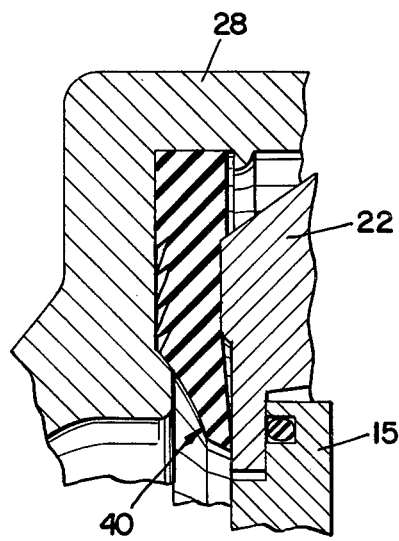
FIG. 4 is a view like FIG. 3 but showing the parts in their final assembled position and in which the gasket is deformed.

Upon operation of locking levers 31, fitting 12 will be moved toward valved fitting 10 so that, as shown in FIG. 4, valved fitting surface 24 will engage gasket surface 44 to tightly clamp serrations 43 into sealing engagement with recess bottom wall 36 and valved fitting surface 25 will deform lip 42 to increase the sealing pressure therebetween.

When fluid flow is subsequently established, the pressure of the fluid acting upon lip surface 48 will further increase the pressure of the sealing contact between the lip and valved fitting surface 25. In addition, because of the saw-tooth nature of serrations 43, if any fluid leaks past a radially inner serration it will act on the next serration to deform it into tighter sealing engagement with surface 36. Also, because serrations 43 initially projected axially beyond surface 46 of the gasket, the serrations deform quite readily under clamping pressure from valved fitting surface 24 so that the gasket will move inwardly until surface 46 engages surface 36, as shown in FIG. 4.

Because of serrations 43 and the fact that they are axially beyond gasket surface 46, the gasket can undergo greater axial deformation from contact with valved surface 24 between initial contact by the latter and a final clamping position than could a gasket in which such serrations are not provided. This permits the parts to have greater dimensional variations for greater ease in manufacture whereby under minimum travel conditions the serrations will establish a seal against surface 36 and under maximum travel conditions the gasket can be deformed without excessive operating pressure on cam levers 31.

Similarly, lip 42 projects far enough so as to establish a seal with surface 25 when cams 33 are in their initial assembly position against valved fitting rib 22 and can readily accommodate substantial deformation when the parts are in their final position as shown in FIG. 4 without imposing a heavy load on the cam levers 31.

I claim:

1. A joint comprising a first member having a first annular transverse face, a second member having a second annular transverse face axially opposed to said first face and having a third annular transverse face radially inwardly of the second face and axially inwardly offset therefrom a fixed predetermined distance, said second and third faces being integral parts of said second member, said members having aligned fluid flow passages centrally of said faces, a gasket between said members, said gasket having a base that is clamped between said first and second faces and having a lip projecting radially inwardly of the base, said lip having a first side with a sealing edge initially engaged with said third face, means on said members for releasably holding said members together with said first and second faces in engagement with said base, said lip having a second side axially opposite said first side and out of contact with said members throughout substantially its entire length whereby fluid in said flow passages may act on substantially the entire said second side to press said edge into tight sealing engagement with said third face.

2. The joint of claim 1 in which said one member has a recess for receiving said gasket, said recess having a circumferential wall surrounding the gasket, said base having a first end face adjacent said first transverse face and having a second end face adjacent said second transverse face, said first end face having a radially outer portion that is flat and having a radially inner portion with serrations thereon that initially project axially beyond said flat outer portion, and a rib projecting radially inward from said circumferential wall and initially engaging said second end face to retain that gasket within said recess in a position in which said serrations are relatively undeformed by contact with said first transverse face and with said radially outer portion axially spaced from said first transverse face, and said serrations being deformable against said first transverse face by clamping action of said second transverse face against said second end face whereby said radially outer portion engages said first transverse face and said rib is out of contact with said second end face.

3. The joint of claim 1 in which said base has a first end face adjacent said first transverse face and having a second end face, said first end face has a radially inner portion with serrations projecting axially therefrom toward said first transverse face and has a radially outer portion that is flat, said second end face has a recess therein axially opposite said serrated portion and having a bottom face engageable by said second transverse face to press said serrations into tight contact with said first transverse face, and the radial width of said serrated portion being substantially the same as the radial width of the second transverse face whereby substantially the entire serrated portion receives direct axial clamping pressure from said second face, and said flat outer marginal portion being initially axially spaced from said first transverse face and the radially outer marginal portion of said second face being out of contact with said second transverse face whereby substantially all the clamping force from said second transverse face is transmitted to said serrated portion via said bottom face.

4. A sealing gasket comprising a ring of elastomeric material, said ring having a base and a lip extending radially inwardly from said base, said base having first and second axial end surfaces, said lip having a first frusto-conical surface intersecting said first end surface and extending axially inwardly thereof, said lip having a second frusto-conical surface intersecting said second end surface and extending axially outwardly thereof, said first end surface having a portion with annular serrations thereon, said first end surface includes a first flat outer marginal portion extending substantially in a direction normal to the axis of the gasket and being of a width greater than the transverse width of one of the serrations, said second end surface has a second outer marginal portion opposite said first outer marginal portion and of substantially the same width thereof and also has a recessed portion axially opposite the serrated portion and of substantially the same radial width as the serrated portion.

5. A sealing gasket comprising a ring of elastomeric material, said ring having a base and a lip that extends radially inward from said base, said base having a first axial end surface with annular serrations therein at its radially inner margin and with a flat surface at its outer margin, the serrations extending axially outwardly of said flat surface, said base having a second axial end surface with a second flat face axially opposite the first flat face and with an inwardly recessed portion axially opposite said serrations, the axial thickness of said base between said flat faces being substantially the same as the axial thickness of the base between said serrations and said recessed portion, said lip having a first frusto-conical surface that intersects said inner margin and extending axially inwardly of the base, said lip having a second frusto-conical surface that intersects said recessed portion and which extends axially outwardly of said base, said first frusto-conical surface being of greater included angle than said second frusto-conical surface whereby said lip is thicker in cross section adjacent said base than remote from said base, said lip having an opening therethrough and said second frusto-conical surface intersecting said opening to form a sharp sealing edge at the axially outermost part of said second frusto-conical surface.

* * * * *